US006628342B2

(12) United States Patent
Tanigawa

(10) Patent No.: US 6,628,342 B2
(45) Date of Patent: Sep. 30, 2003

(54) VIDEO SIGNAL PROCESSING APPARATUS

(75) Inventor: Satoru Tanigawa, Hyogo (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 343 days.

(21) Appl. No.: 09/753,680

(22) Filed: Jan. 4, 2001

(65) Prior Publication Data
US 2001/0006405 A1 Jul. 5, 2001

(30) Foreign Application Priority Data
Jan. 5, 2000 (JP) ........................................ 2000-000253

(51) Int. Cl.[7] .............................. H04N 9/64; H04N 9/68
(52) U.S. Cl. ...................... 348/649; 348/653; 348/587; 348/592; 348/654; 358/520
(58) Field of Search ................................. 348/648, 649, 348/650, 651, 652, 653, 654, 587, 592, 703; 358/520; 382/167

(56) References Cited

U.S. PATENT DOCUMENTS

| 569,641 | A | * | 10/1896 | Heckert | 249/62 |
| 4,587,552 | A | * | 5/1986 | Chin | 348/651 |
| 4,679,072 | A | * | 7/1987 | Takayama | 358/520 |
| 4,885,642 | A | | 12/1989 | Senba | |
| 4,910,465 | A | * | 3/1990 | Dillman | 327/7 |
| 5,161,005 | A | * | 11/1992 | Harradine | 348/649 |
| 5,311,328 | A | * | 5/1994 | Murata | 358/447 |
| 5,631,749 | A | * | 5/1997 | Ueda | 358/520 |
| 5,654,768 | A | * | 8/1997 | Hatano | 348/640 |
| 5,757,439 | A | * | 5/1998 | Kim | 348/645 |
| 5,767,899 | A | * | 6/1998 | Hieda et al. | 348/222.1 |
| 5,995,164 | A | * | 11/1999 | Tsyrganovich | 348/649 |
| 5,999,230 | A | * | 12/1999 | Tanabe | 348/649 |
| 6,515,714 | B1 | * | 2/2003 | Tachibana | 348/654 |

FOREIGN PATENT DOCUMENTS

| JP | 63-203070 | 8/1988 |
| JP | 1-152893 | 6/1989 |
| JP | 10-191372 | 7/1998 |

* cited by examiner

Primary Examiner—John Miller
Assistant Examiner—Brian Yenke
(74) Attorney, Agent, or Firm—Wenderoth, Lind & Ponack, L.L.P.

(57) ABSTRACT

A video signal processing apparatus A comprises: an adder 107 for generating a second address value S106 which has a predetermined phase difference from a first address value S101 outputted by an address value output means 120 and outputting the same; a selector 108 for selecting either a first address value S101 or a second address value S106 to output as an output signal S107; a vertical synchronizing signal output means 123 for outputting the vertical synchronizing signal S104 to the selector 108; a ROM 109 for outputting first data corresponding to the first address value S101 or second data corresponding to the second address value S106 as a signal S108; a loading hold mode flip-flop 110 for preserving the first data; a loading hold mode flip-flop 111 for preserving the second data; and a hue adjustment means B which adjusts the hue of the video signal by using the output signal S109 of the loading hold mode flip-flop 110 and the output signal S110 of the loading hold mode flip-flop 111. Therefore, a video signal processing apparatus which can reduce a circuit size with maintaining performance can be provided.

4 Claims, 7 Drawing Sheets

VIDEO SIGNAL PROCESSING APPARATUS

FIELD OF THE INVENTION

The present invention relates to a video signal processing apparatus which adjusts a hue of an image displayed on a display device when a video signal outputted by a video signal reception means is displayed on the display device.

BACKGROUND OF THE INVENTION

In recent years, in a television image receiver, when a video signal is processed by using the digital signal processing technology, it has been increasing to adjust the hue of a display screen by using a memory, a ROM, and the like, and a circuit configuration has been increasing with this increase. So, in order to minimize the circuit configuration and to rationalize a circuit configuration, it has been desired for a video signal processing apparatus which shares circuits such as the ROM as much as possible and therefore is rationalized, and such a video signal processing apparatus has been developed.

A conventional video signal processing apparatus will be briefly described with reference to figures.

FIG. 8 is a block diagram illustrating the conventional video signal processing apparatus X. As shown in FIG. 8, the video signal processing apparatus X is provided with an address value output means 510 which outputs an address value for adjusting the hue; multipliers 501, 502, 503, and 504; adders 505 and 506; a cos $\Delta\theta$ data ROM 507 which records the cos $\Delta\theta$ data shown in FIG. 7(b) (hereinafter, referred as "ROMcos $\Delta\theta$"); and a sin $\Delta\theta$ data ROM 508 which records the sin $\Delta\theta$ data shown in FIG. 7(a) (hereinafter, referred as "ROMsin $\Delta\theta$"). Further, a hue adjustment means Y which adjusts the hue of the video signal received by a video signal reception means 511 to output to the display device 512 is composed of multipliers 501, 502, 503, and 504, and adders 505 and 506. Further, the address value which is outputted by the address value output means 510 can be freely set by a user.

The hue adjustment in the video signal processing apparatus X so constructed will be described with reference to figures.

A video signal contains two color difference signals, that is, a B-Y signal and an R-Y signal. Then, though the hue is decided by these two signals, this is shown by a coordinate where a B-Y signal and a R-Y signal are regarded on an axis of abscissa and on an axis of ordinate, respectively, as shown in FIG. 2. In FIG. 2, $\theta$ shows the original states of the inputted color difference signals, and the coordinate of the signal which is composed of the R-Y signal and the B-Y signal which are the inputted color difference signals. Further, how much the user changes the hue from this original state, that is, the amount of the change corresponds to $\Delta\theta$. (Here, it is also expressed as "to twist a hue" that the user changes the hue). Then, as shown in FIG. 2, the hue is, for example, shown such as a point A and a point B. Incidentally, it is $\theta=0$ in the case of blue, the coordinate of which becomes (A, 0), and it is $\theta=90$ in the case of red, the coordinate of which becomes (0, A). Hereinafter, the coordinate of the A point (starting point) and the coordinate of the B point (correction point) are represented as ({R-Y}a, {B-Y}a) and ({R-Y}b,{B-Y}b), respectively. The following relational expressions stand between these coordinates:

$$\{R\text{-}Y\}b = \{R\text{-}Y\}a \times \cos\Delta\theta + \{B\text{-}Y\}a \times \sin\Delta\theta \quad (1)$$

$$\{B\text{-}Y\}b = \{B\text{-}Y\}a \times \cos\Delta\theta - \{R\text{-}Y\}a \times \sin\Delta\theta \quad (2)$$

Therefore, for example in FIG. 2, it can be said that the video signal processing apparatus X should perform the operation of moving the hue shown by the A point to the B point. Further, the calculations of the above-described formulae (1) and (2) are performed in the hue adjustment means Y. Hereinafter, the operation of the video signal processing apparatus X will be described.

While the address value S501 outputted by the address value output means 510 is set by user, this address value S501 is inputted to ROMcos $\Delta\theta$ 507 and ROMsin $\Delta\theta$ 508, respectively. In the ROMcos $\Delta\theta$ 507, data corresponding to the inputted address value S501 is decided by cos $\Delta\theta$ data shown in FIG. 7(b) to be outputted as an output signal S504. Similarly in ROMsin $\Delta\theta$ 508, data corresponding to the inputted address value S501 is decided by sin $\Delta\theta$ data shown in FIG. 7(a) to be outputted as an output signal S505. These data are inputted to the hue adjustment means Y, that is, multipliers 501, 502, 503, and 504, and adders 505 and 506. Then, the calculations of the above-described formulae (1) and (2) are performed in this hue adjustment means Y, and the processed data is outputted as a modified R-Y signal S506 and a modified B-Y signal S507, in addition to the R-Y signal S502 and the B-Y signal S503 which are inputted to the hue adjustment means Y.

For example, in case where the inputted address value is (00) in a hexadecimal number notation (hereinafter, the same notation is employed), when this is inputted to ROMcos $\Delta\theta$ 507 and ROMsin $\Delta\theta$ 508 as the address signal S501, the output signal S505 (=sin $\Delta\theta$) becomes "0", and the output signal S504 (=cos $\Delta\theta$) becomes "1" according to FIGS. 7(a) and 7(b). When these are inputted to the above-described formulae (1) and (2), it results as follows:

$$\{R\text{-}Y\}b = \{R\text{-}Y\}a \times 1 + \{B\text{-}Y\}a \times 0 = \{R\text{-}Y\}a \quad (3)$$

$$\{B\text{-}Y\}b = \{B\text{-}Y\}a \times 1 - \{R\text{-}Y\}a \times 0 = \{B\text{-}Y\}a \quad (4)$$

Therefore, the inputted signals are outputted as they are. In other words, the coordinate of the B point is equal to that of the A point, meaning that the A point is equal to the B point. This means that a correction point does not exist and that there is no change in the hue.

Next, a description will be given of a case where the phase is rotated by 90 degrees. In case where the inputted address value is (40), this is inputted to ROMcos $\Delta\theta$ 507 and ROMsin $\Delta\theta$ 508 as the address signal S501, whereby the output signal S505 becomes "1" and the output signal S504 becomes "0", respectively, according to FIGS. 7(a) and 7(b). When these are inputted to the above-described formulae (1) and (2), it results as follows:

$$\{R\text{-}Y\}b = \{R\text{-}Y\}a \times 0 + \{b\text{-}Y\}a \times 1 = \{B\text{-}Y\}a \quad (5)$$

$$\{B\text{-}Y\}b = \{B\text{-}Y\}a \times 0 - \{R\text{-}Y\}a \times 1 = \{R\text{-}Y\}a \quad (6)$$

Therefore, it is understood that the phase has rotated by 90 degrees from the A point.

However, the video signal processing apparatus X as described above results in that the whole circuit size becomes large because two kinds of ROMs, the cos $\Delta\theta$ data ROM and the sin $\Delta\theta$ data ROM, are required in view of its configuration.

SUMMARY OF THE INVENTION

The present invention is directed to solve the above problems, and it is an object of the present invention to provide a video signal processing apparatus which can reduce a circuit size in comparison with the conventional video signal processing apparatus as well as exhibit the performance which is equivalent to the conventional video signal processing apparatus.

To accomplish the above-described object, according to a first aspect of the present invention, a video signal processing apparatus which adjusts a hue of an image displayed on a display device when a video signal outputted from a video signal reception means is displayed on the display device comprises: address value output means which outputs an address value for adjusting the hue; addition means for generating a second address value corresponding to a phase value which has a predetermined phase difference from a phase value corresponding to a first address value by adding a predetermined value to the first address value outputted from the address value output means; selection means for selecting either the first address value which is outputted from the address value output means or the second address value which is outputted from the addition means; switching signal output means for outputting a switching signal for performing selection in the selection means to the selection means; storage means which previously stores data corresponding to the address value for adjusting the hue as well as decides the predetermined value, receives as an input the address value outputted from the selection means, and, when the inputted address value is the first address value, outputs the first data corresponding to the first address value, and when the inputted address value is the second address value, outputs the second data corresponding to the second address value; first latch means for preserving the first data, corresponding to the switching signal outputted by the switching signal output means; second latch means for preserving the second data, corresponding to the switching signal outputted by the switching signal output means; and hue adjustment means which adjusts the hue of the video signal received in the video signal reception means to output to the display device, by using the outputs of the first latch means and the second latch means.

Therefore, a single ROM can perform function of two ROMs. As a result, the video signal processing apparatus, which can reduce a circuit without losing performance in comparison with the conventional video signal processing apparatus, can be realized.

According to a second aspect of the present invention, in the video signal processing apparatus of the first aspect, data stored in the storage means in advance are in such a phase relation that a phase of first data corresponding to the first address value and a phase of second data corresponding to the second address value are of sinusoidal wave and cosine wave, respectively.

Therefore, the first and second data which are outputted from a ROM are loaded and held by a vertical synchronizing signal, whereby the sin Δθ data and the cos Δθ data are taken out from a single ROM. As a result, the video signal processing apparatus, which can reduce a circuit size without losing performance in comparison with the conventional video signal processing apparatus can be realized.

According to a third aspect of the present invention, the video signal processing apparatus of the first or second aspect, is provided with a load and hold circuit that comprises the first and second latch means, and is further provided with a flip-flop.

Therefore, the hue can be changed outside an effective screen area of the display device. Accordingly, an image, which has a uniform hue inside the effective screen area, can be always obtained.

DETAILED DESCRIPTION OF THE PREFERRED EMBODIMENTS

Hereinafter, embodiments of the present invention will be described with reference to figures. The embodiments shown below are examples of the present invention, and the present invention is not limited to these embodiments.

[Embodiment 1]

Initially, the video signal processing apparatus corresponding to one embodiment of the present invention will be described as a first embodiment with reference to figures.

Figure 1:
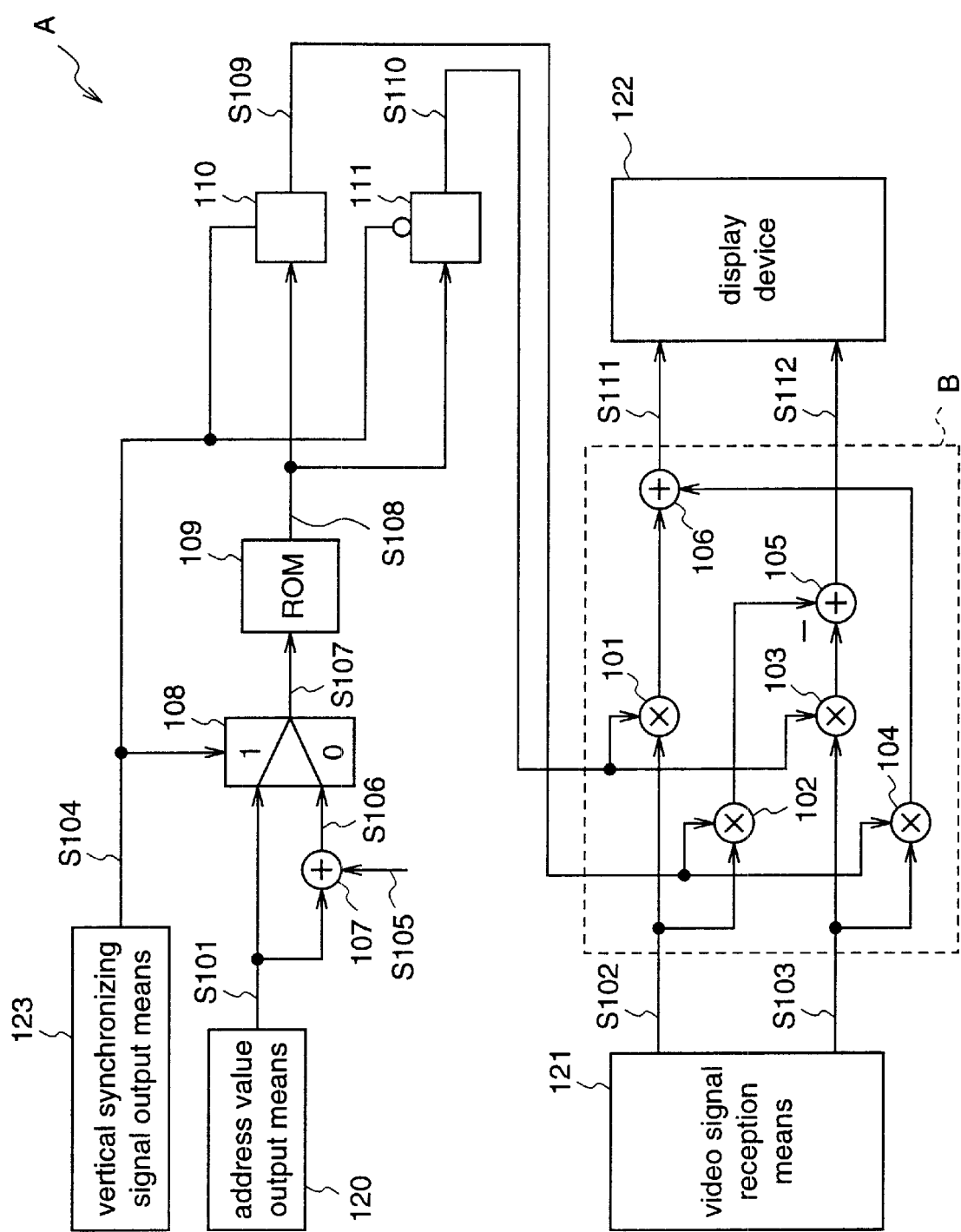
FIG. 1 is a block diagram illustrating a video signal processing apparatus according to a first embodiment.
Figure 2:
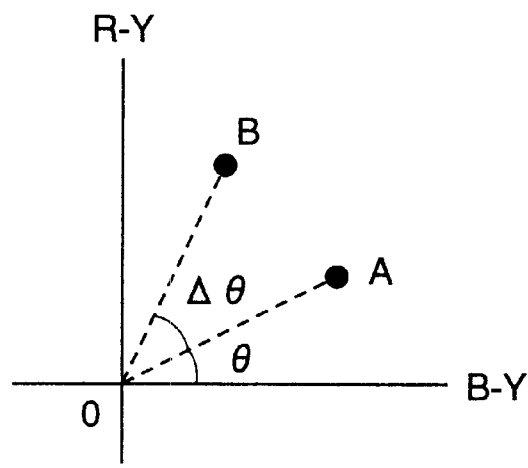
FIG. 2 is a conceptional diagram for explaining a principle of a hue adjustment.

FIG. 1 is a block diagram illustrating the video signal processing apparatus A in the first embodiment. As shown in FIG. 1, the video signal processing apparatus A comprises: an address value output means 120 which outputs the address value for adjusting the hue of the image; an adder 107 which is an addition means for generating a second address value S106 which has a predetermined phase difference from a first address value S101 by adding an added value (predetermined value) S105 to the first address value S101 outputted from the address value output means 120; a selector 108 which is a selection means for selecting either a first address value S101 which is outputted from the address value output means 120 or a second address value S106 which is outputted from the adder 107 to output as an output signal S107; a vertical synchronizing signal output means 123 which is the switching signal output means for outputting the vertical synchronizing signal S104 which is the switching signal for selection in the selector 108; a ROM 109 which is a storage means which previously stores data which corresponds to the address value for adjusting the hue as well as decides the added value S105, receives as an input the address value outputted from the selector 108 as the output signal S107, and, when the inputted address value is the first address value S101, outputs the first data corresponding to the first address value S101 as an output signal S108, and when the inputted address value is the second address value S106, outputs the second data corresponding to the second address value S106 as an output signal S108; a load and hold flip-flop 110 which is a first latch means for preserving the first data, corresponding to the vertical synchronizing signal S104 outputted from the vertical synchronizing signal output means 123; a load and hold flip-flop 111 which is a second latch means for preserving the second data, corresponding to the vertical synchronizing signal S104 outputted from the vertical synchronizing signal output means 123; and a hue adjustment means B which adjusts the hue of the video signal received in the video signal reception means 121 to output to a display device 122, by using the output signal S109 of the load and hold flip-flop 110 and the output signal S110 of the load and hold flip-flop 111. Further, the added value S105 is decided by the data written in the ROM 109 in advance as described above. Moreover, the load and hold flip-flop 110 employs the vertical synchronizing signal S104 as a load and hold mode pulse. The load and hold flip-flop 111 employs the one which is obtained by inverting the polarity of the vertical synchronizing signal S104 as the loading hold mode pulse. Then, a hue adjustment means B is constituted by multipliers 101, 102, 103, and 104, and adders 105 and 106.

Figure 7:
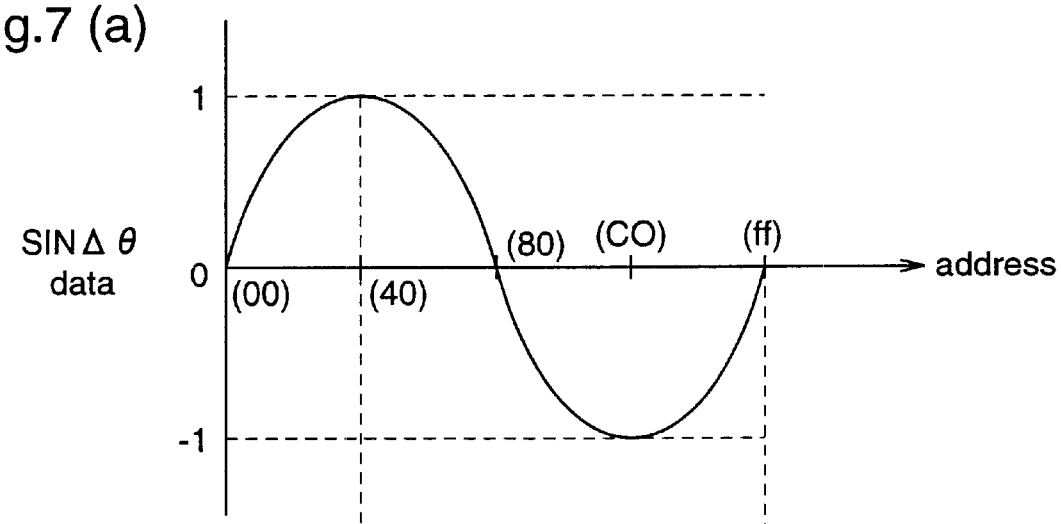
FIGS. 7(a)–7(b) are examples of data which is previously written in the ROM in the conventional video signal processing apparatus.
Figure 7:
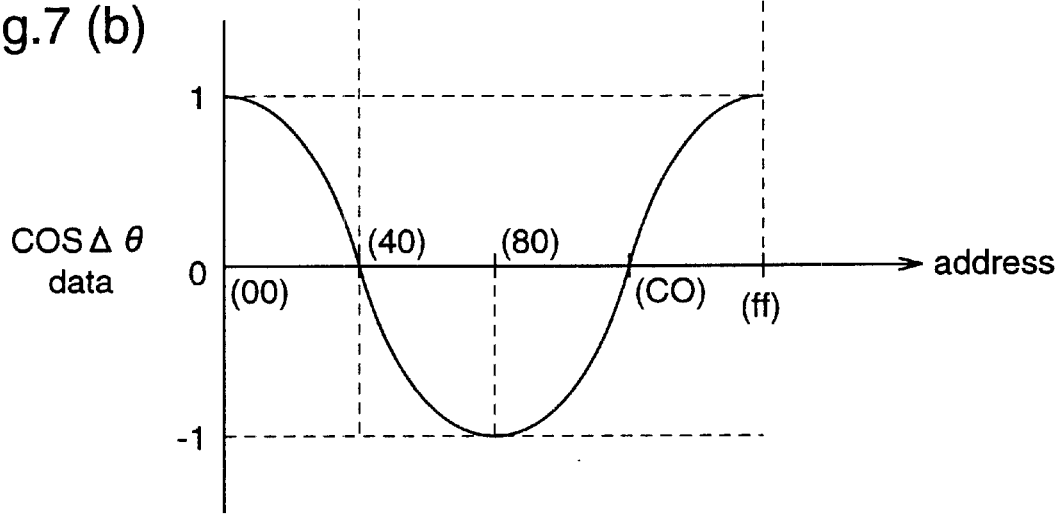

In the first embodiment, data corresponding to the address value for adjusting the hue written in the ROM 109 in advance is such data that the relation between the phase of the first data corresponding to the first address value S101 and the phase of the second data corresponding to the second address value S106 is in the phase relation between the sinusoidal wave and the cosine wave. In other words, while it is supposed to be the sin Δθ data as shown in FIG. 7(a), this data may be the cos Δθ data as shown in FIG. 7(b). It is desirable that the added value S105 is such a value that the relation between the phase of the first data corresponding to the first address value S101 and the phase of the second data corresponding to the second address value S106 is in the phase relation between the sinusoidal wave and the cosine wave, that is, the phase relation that the phase value of the first address value S101 and the phase value of the second address value S106 have the phase difference of 90 degrees. Here, the utilization of the data written in the ROM 109 will be described with reference to FIG. 3.

Figure 3:
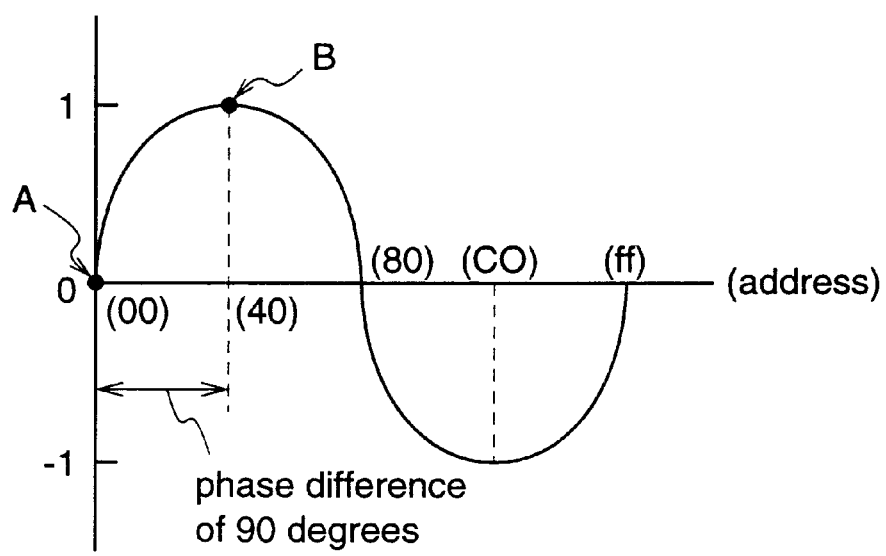
FIG. 3 is an example of data which is previously written in the ROM in the video signal processing apparatus of the present invention.

FIG. 3 is a diagram showing data which is recorded in the ROM 109. This ROM 109 is supposed to be one to which address setting of 8 bits is possible. In FIG. 3, a transverse axis shows an address, a vertical axis shows magnitude of data, and the diagram shows the sin Δθ data in 8-bit address. When a reference point is regarded as address (00), the address value in the point where the phase changes by 90 degrees from the reference point is (40). Similarly, the address value at the point where the phase changes by 180 degrees, by 270 degrees, and by 360 degrees become (80), (C0), and (ff), respectively.

Figure 8:
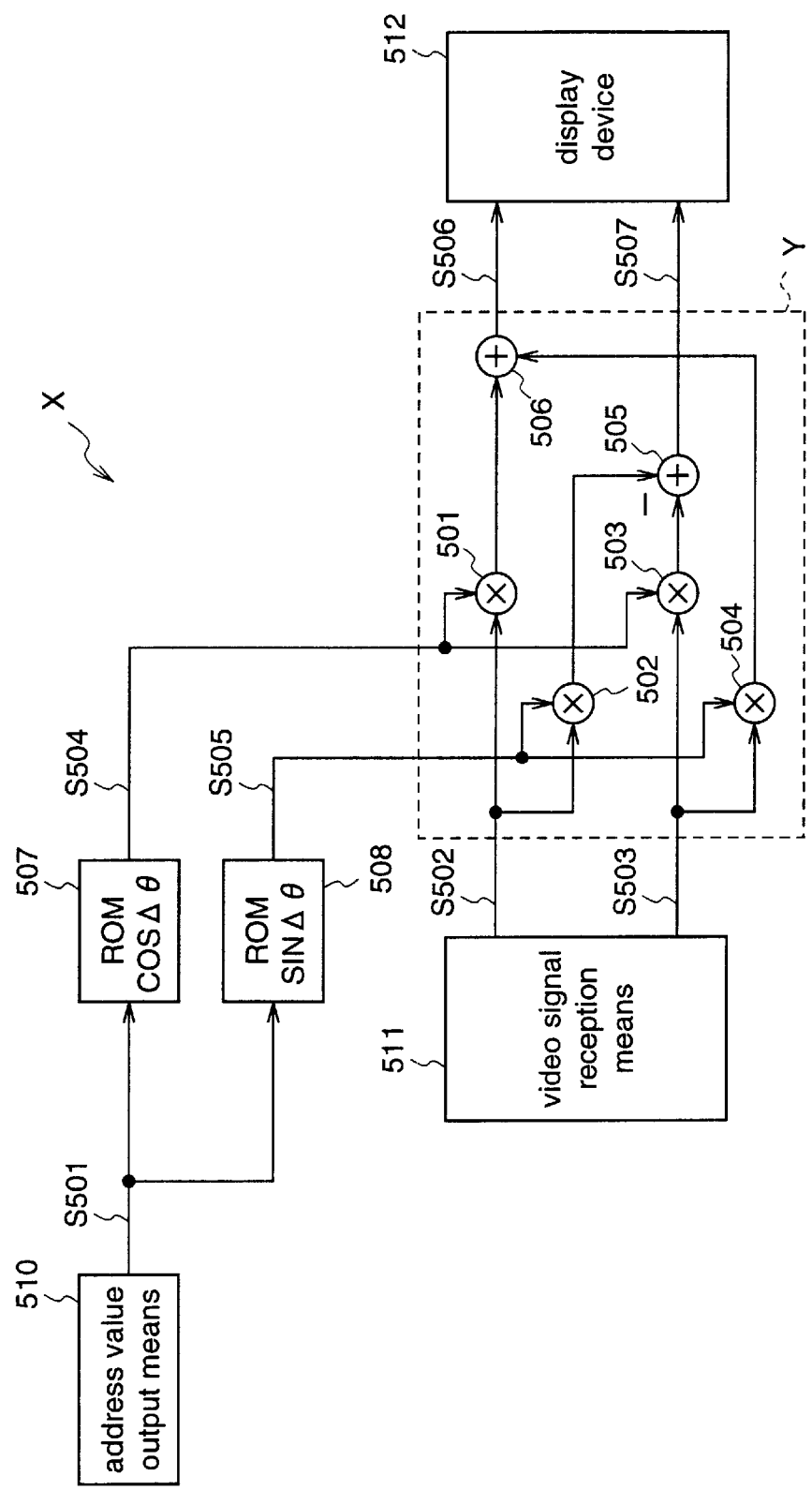
FIG. 8 is a block diagram illustrating the conventional video signal processing apparatus.

Here, the first address value S101 is a signal which hue can be adjusted in accordance with the user's taste, and the second address value S106 is a signal which can be obtained by adding the added value S105 to the first address value S101. Then, the second address value S106 has the phase difference of 90 degrees from the first address value S101 as described above by adding the added value S105. This will be described further. It is supposed that the first data corresponding to the first address value S101 is at an A point in FIG. 3, and the second data corresponding to the second address value S106 is at a B point in FIG. 3. The second address value S106 changes similarly as the first address value S101 changes. That is, when the first address value S101 changes from an address (00) to addresses (40), (80), . . . , the second address value S106 changes from an address (40) to addresses (80), (C0), . . . , at the same time. When the change of the second data which accompanies an address change of this second address value S106 is traced, it results the same as the curve of the cos Δθ data. On the other hand, when a change of the first data is traced, it, of course, results the same as the curve of the sin Δθ data. That is, the user not only obtains the sin Δθ data by operating the first address value S101, but also obtains the cos Δθ data automatically because the user's operation of the first address value S101 results in operating also the second address value S106 automatically. That is, by only that the sin Δθ data is written in ROM 109 in advance, the ROM 109 can perform a function of two ROMs, i.e., the ROMsin Δθ 508 and the ROMcos Δθ 507, in the conventional video signal processing apparatus X as shown in FIG. 8.

In the first embodiment, it is constructed such that the vertical synchronizing signal S104 is employed in order to switch two kinds of address values, that is, the first address value S101 and the second address value S106, to be inputted to ROM109. A description will be given of the operation of the video signal processing apparatus A so constructed, with reference to a timing charts shown in FIGS. 4(a)–4(g).

Figure 4:
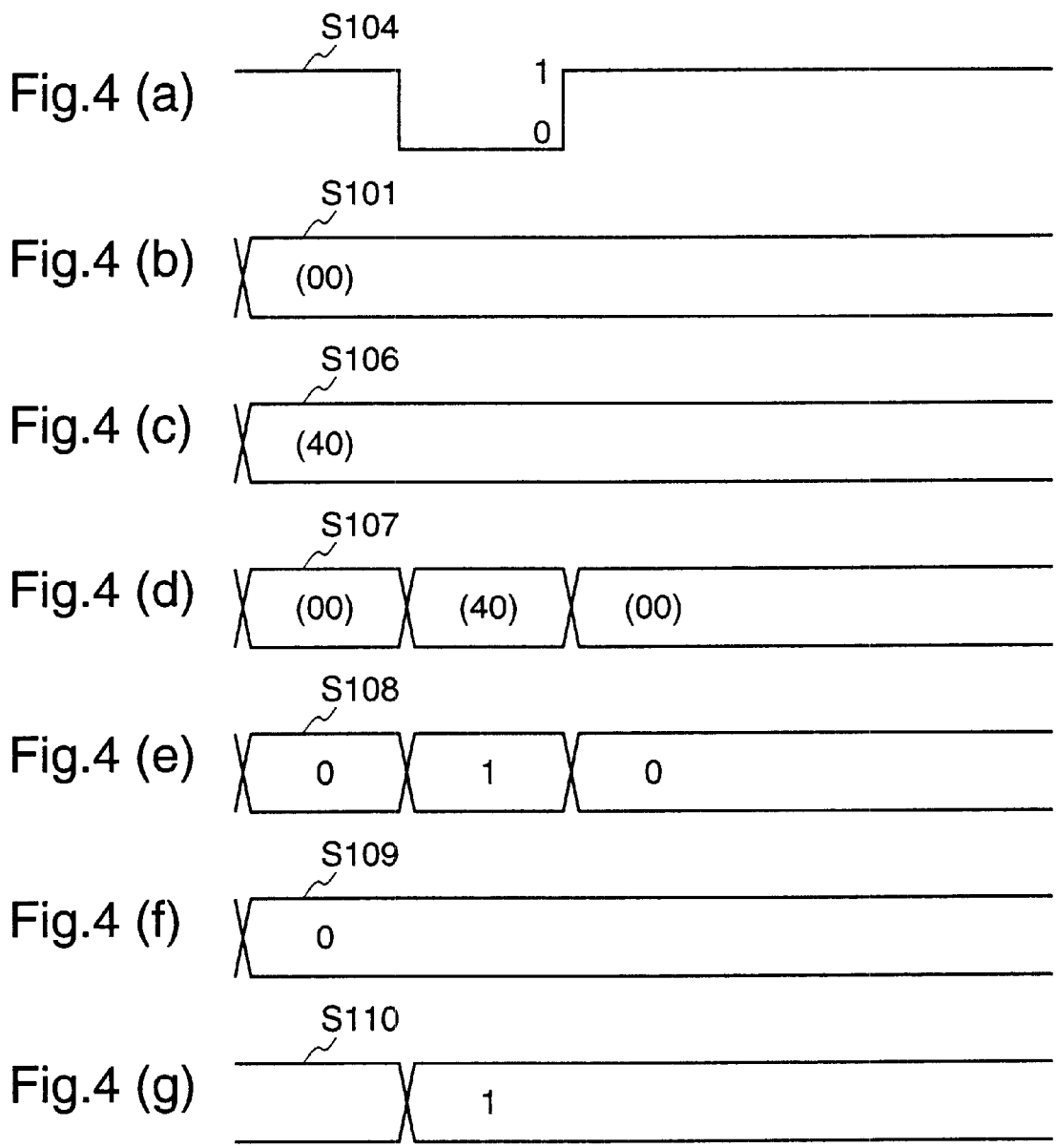
FIGS. 4(a)–4(g) are timing charts in the video signal processing apparatus according to the first embodiment.

FIG. 4(a) shows a timing chart of the vertical synchronizing signal S104 which is to be inputted. FIG. 4(b) shows a timing chart of the first address value S101. FIG. 4(c) shows a timing chart of the second address value S106. FIG. 4(d) is a timing chart of the output signal S107 of the selector 108. FIG. 4(e) is a timing chart of the output signal S108 of ROM 109. FIG. 4(f) shows a timing chart of the output signal S109 of the load and hold flip-flop 110. FIG. 4(g) shows a timing chart of the output signal S110 of the load and hold flip-flop 111.

The first address value S101 is a signal that can adjust the hue in accordance with the user's taste, and the second address value S106 is a signal that can be obtained by adding such an added value S105 that a phase rotates by 90 degrees in the adder 107. That is, when the first address value S101 is (00) as shown in FIG. 4(b), the second address value S106 becomes (40) as shown in FIG. 4(c).

Next, while the first address value S101 and the second address value S106 are inputted to the selector 108, the selector 108 decides which of the first address value S101 or the second address value S106 is to be outputted as the output signal S107, in accordance with the polarity of the vertical synchronizing signal S104. That is, when the polarity of the vertical synchronizing signal S104 changes from positive to negative as shown in FIG. 4(a), in place of the first address signal S101 ((00)) being outputted as the second address value S106 ((40)) is made the output signal S107, as shown in FIG. 4(d), and vice versa.

Next, the ROM 109, which receives the output signal S107 of the selector 108 as input outputs data corresponding to the inputted signal as the output signal S108. That is, when the first address value S101 is inputted, the first data is outputted, and when the second address value S106 is inputted, the second data is outputted. Further, the data written in the ROM 109 in advance is the sin Δθ data. Therefore, the first data for the first address value S101 ((00)) and the second data for the second address value S106 ((40)) are "0" as shown in FIG. 3 and "1" as shown in FIG. 3, respectively. That is, the output signal S108 changes as shown in FIGS. 4(d) and 4(e), respectively.

This output signal S108 is captured by the load and hold mode flip-flop 110 which employs the vertical synchronizing signal S104 as a load and hold mode pulse, and the load and hold mode flip-flop 111 which employs the one the polarity of the vertical synchronizing signal S104 is inverted as the load and hold mode pulse. Thereby, the first data S109 and the second data S110 are held by the load and hold flip-flop 110 and the load and hold flip-flop 111, respectively. Here, in the ROM 109, the sin Δθ data as shown in FIG. 3 is written in advance. Therefore, "0" is taken out as the first data S109 for the first address value S101 ((00)). Moreover, "1" as data in the position where the phase rotates by 90 degrees is taken out as the second data S110 for the second address value S106 ((40)). In addition, the value "1" which is taken out as the second data S110 corresponds to the cos Δθ data in (00). That is, "0" is held in the load and hold flip-flop 110 because it receives as input inputs the output signal S108 of the ROM 109 at the point where the polarity of the vertical synchronizing signal S104 is positive, as shown in FIG. 4(f). "1" is held in the load and hold flip-flop 111 because it receives as input inputs the output signal S108 of the ROM 109 at the time when the polarity of the vertical synchronizing signal S104 changes from positive to negative.

Then, the first data S109 and the second data S110 are inputted to the hue adjustment means B. These data are added and multiplied to the R-Y signal S102 and the B-Y signal S103 which are received by the video signal reception means 121, respectively, and the results are converted into the modified R-Y signal S111 and the modified B-Y signal S112, respectively, to be outputted to the display device 122. As these multiplication and addition, the formulae (1) and (2) described in the Background Art are applicable. In this way, the hue of the inputted video signal is adjusted.

As described above, in this first embodiment, it is possible that the sin Δθ data and the cos Δθ data are taken out from a single ROM by a construction having a single ROM which holds the sin Δθ data. Therefore, it is possible to reduce the circuit size of the video signal processing apparatus which adjusts the hue. Furthermore, in this first embodiment, as the data written in the ROM 109 in advance, the sin Δθ data is employed. However, even when the cos Δθ data is employed, similar effects can be obtained.

[Embodiment 2]

The video signal processing apparatus as defined in another embodiment of the present invention will be described as a second embodiment with reference to figures.

Figure 5:
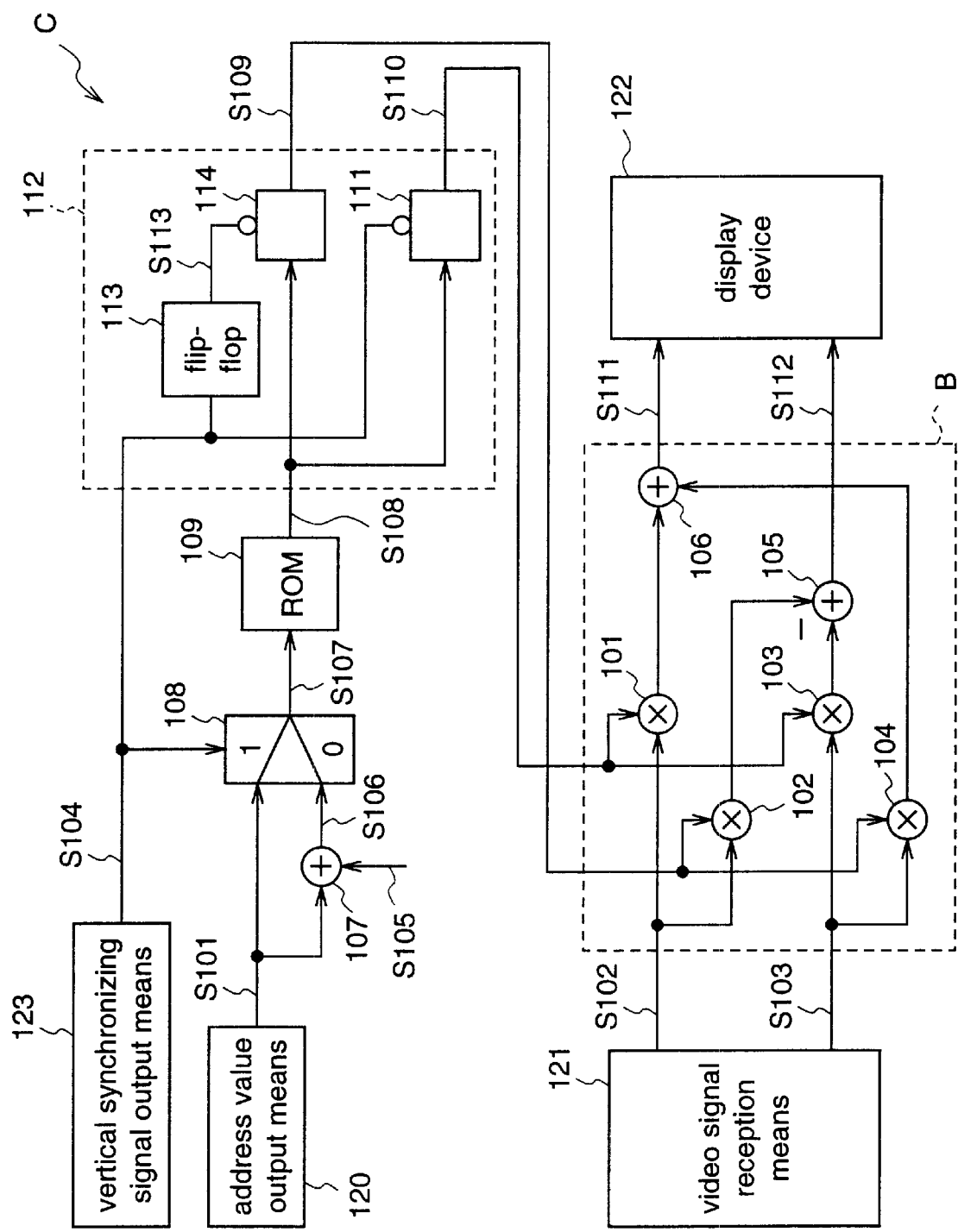
FIG. 5 is a block diagram illustrating the video signal processing apparatus according to a second embodiment.

As shown in FIG. 5, the video signal processing apparatus C according to this second embodiment basically has the similar structure as the video signal processing apparatus A according to the first embodiment as shown in FIG. 1. However, the apparatus C is newly provided with a load and hold mode circuit.

Initially, this load and hold circuit 112 will be described. The load and hold circuit 112 is constituted by a load and hold flip-flop 114 which employs the one the polarity of the load and hold mode pulse S113 which is an output signal of the flip-flop 113 is reversed as the load and hold mode pulse, and the load and hold flip-flop 111 which employs the one the polarity of the vertical synchronizing signal S104 is reversed as the load and hold mode pulse. Further, load and hold flip-flop 114 operates as a first latch means, and preserves the first data, corresponding to the vertical synchronizing signal S104 outputted by the vertical synchronizing signal output means 123. The load and hold flip-flop 111 operates as a second latch means, and preserves the second data, corresponding to the vertical synchronizing signal S104 outputted by the vertical synchronizing signal output menas 123. Further, the load and hold mode flip-flop 111 is the same as described in the first embodiment.

A description will be given of a video signal processing apparatus C having this load and hold mode circuit hereinafter. However, since the process until an output signal S108 is outputted from the ROM 109 is the same as that in the video signal processing apparatus A described in the first embodiment, the description is omitted.

The output signal S108 outputted from the ROM 109 is captured by the load and hold flip-flop 114 which employs the load and hold mode pulse S113 which is obtained by delaying the vertical synchronizing signal S104 by one clock pulse in the flip-flop 113 as the load and hold mode pulse, and which can load when the polarity of this pulse is negative, and the load and hold flip-flop 111 which employs the vertical synchronizing signal S104 as the load and hold mode pulse, and which can load when the polarity of this pulse is negative. That is, when the vertical synchronizing signal S104 is inputted to the load and hold circuit 112, the first data S109 corresponding to the first address value S101 and the data S110 corresponding to the second address value S106 are held by the load and hold flip-flop 114 and 111, respectively.

This operation will be described, further with reference to timing charts.

Figure 6:
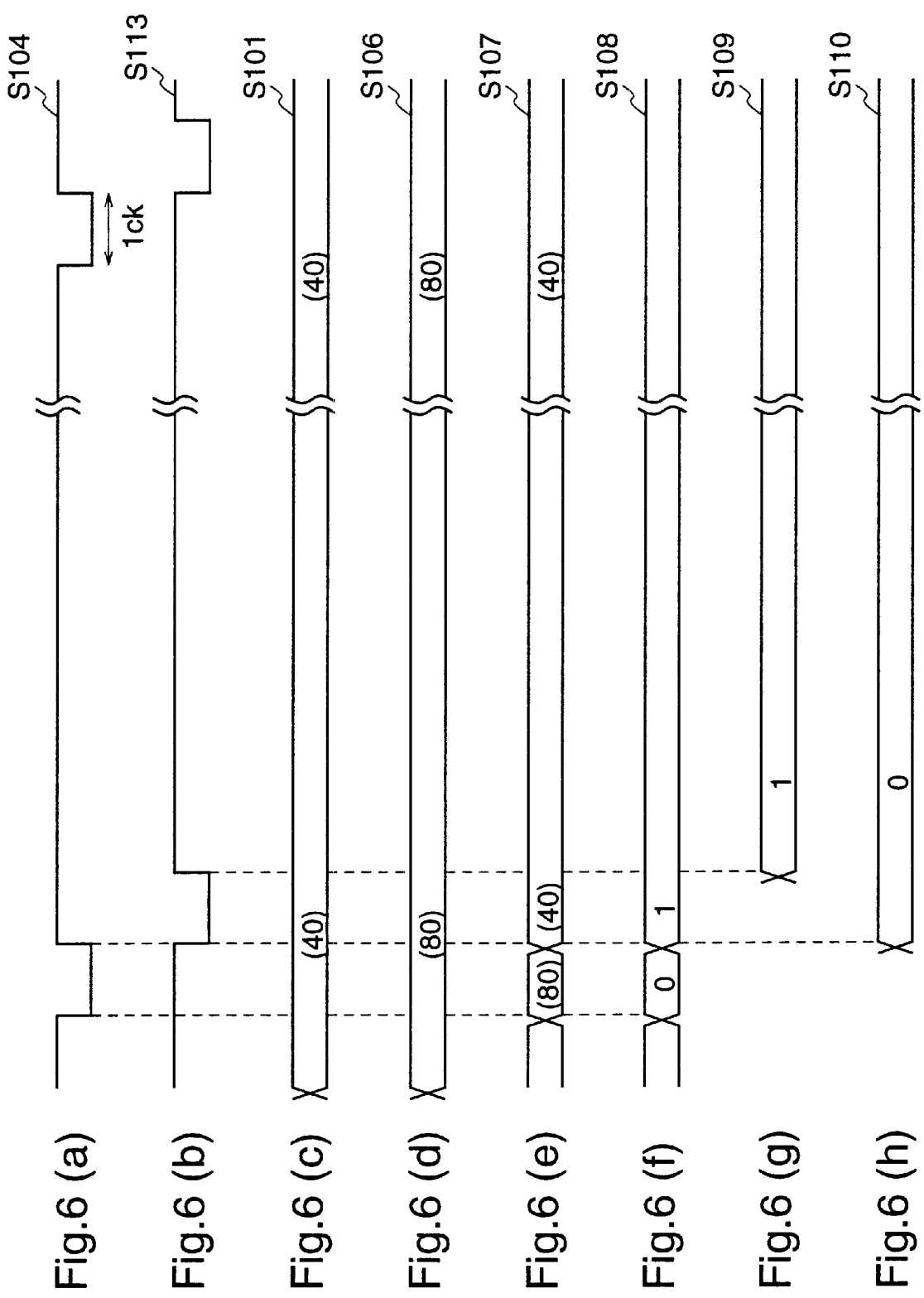
FIGS. 6(a)–6(h) are timing charts in the video signal processing apparatus according to the second embodiment.

FIGS. 6(a)–6(h) are timing charts of the video signal processing apparatus C in this second embodiment. FIG. 6(a) is a timing chart of the inputted vertical synchronizing signal S104. FIG. 6(b) is a timing chart of the output signal S113 which has latched the vertical synchronizing signal S104 in the flip-flop 113. FIG. 6(c) is a timing chart of the first address value S101. FIG. 6(d) is a timing chart of the second address value S106. FIG. 6(e) is a timing chart of the output signal S107 of the selector 108. FIG. 6(f) is a timing chart of the output signal S108 of the ROM 109. FIG. 6(g) is a timing chart of the output signal S109 of the load and hold mode flip-flop 114. FIG. 6(h) is a timing chart of the output signal S110 of the load and hold flip-flop 111.

Initially, as shown in FIG. 6(c), when the first address value S101 is (00), "0" is taken out from the first data S109 for the first address value S101. Further, as shown in FIG. 6(d), the second data S110 for the second address value S106 is data for a signal value the phase of which is different from that of the first address value by 90 degrees. Therefore, "1" is taken out as the second data S110. This correspond to the cos Δθ data in the address signal (00).

Next, as shown in FIG. 6(c), the user changes the first address value S101 from (00) to (40). Then, the added value S105 is added to the first address value S101 by the adder 107. Thereby, the second address value S106 changes from (40) to (80) as shown in FIG. 4(d) at the same time when the first address value S101 changes.

When the vertical synchronizing signal S104 is in a state of negative as shown in FIG. 6(a), the selector 108 which has outputted (40) of the first address value S101 until then, outputs (80) of the second address value S106 as the output signal S107, with which the output signal S108 outputted from the ROM 109 changes from "1" to "0" as shown in FIG. 6(f). Then, when the vertical synchronizing signal S104 returns from a negative state to a positive state, the output signal S107 returns from a state outputting (80) to a state outputting (40), with which the output signal S108 from the ROM 109 returns from "0" to "1".

Further, as shown in FIG. 6(g), the load and hold flip-flop 114 captures the data which is inputted when the polarity of the load and hold mode pulse S113 which is the output signal of the flip-flop 113 is negative. As shown in FIG. 6(h), the loading hold mode flip-flop 111 captures the data which is inputted when the polarity of the vertical synchronizing signal S104 is negative.

The operation as described above is performed, whereby the sin Δθ data and the cos Δθ data are taken out from the ROM 109 where the sin Δθ is written in, by only inputting the first address value S101. Then, these results are inputted to the hue adjustment means B, and the hue is converted. In this second embodiment, the load and hold circuit 112 is provided, and this load and hold circuit 112 has a configuration as shown in FIG. 5. Therefore, when the vertical synchronizing signal S104 is inputted after being made the load and hold mode pulse S113 by being latched has been latched in the flip-flop 113, and then is inputted to the load and hold flip-flop 114, it is possible that the phase is changed outside an effective screen area of the display device 122.

Furthermore, as described in this second embodiment, the sin Δθ data and the cos Δθ data can be taken out by only having a single ROM which has the sin Δθ data. Therefore, it is possible that the circuit size of the video signal processing apparatus which adjusts the hue is made small. Further, in this second embodiment, as the data written in the ROM 109 in advance, the sin Δθ data is employed. However, even when this is the cos Δθ data, similar effects can be obtained.

What is claimed is:

1. A video signal processing apparatus which adjusts a hue of an image displayed on a display device when a video signal outputted from a video signal reception means is displayed on the display device, comprising:

address value output means which outputs an address value for adjusting the hue;

addition means for generating a second address value corresponding to a phase value which has a predetermined phase difference from a phase value corresponding to a first address value by adding a predetermined value to the first address value outputted from the address value output means;

selection means for selecting either the first address value which is outputted from the address value output means or the second address value which is outputted from the addition means;

switching signal output means for outputting a switching signal for performing the selection in the selection means to the selection means;

storage means which previously stores data corresponding to the address value for adjusting the hue as well as decides the predetermined value, receives as an input the address value outputted from the selection means, and, when the inputted address value is the first address value, outputs the first data corresponding to the first address value, and when the inputted address value is the second address value, outputs the second data corresponding to the second address value;

first latch means for preserving the first data, corresponding to the switching signal outputted by the switching signal output means;

second latch means for preserving the second data, corresponding to the switching signal outputted by the switching signal output means; and hue adjustment means which adjusts the hue of the video signal received in the video signal reception means to output to the display device by using the outputs of the first latch means and the second latch means.

2. The video signal processing apparatus of claim 1 wherein data stored in the storage means in advance are in such a phase relation that a phase of first data corresponding to the first address value and a phase of second data corresponding to the second address value are of sinusoidal wave and cosine wave, respectively.

3. The video signal processing apparatus of claim 1, further comprising:

a load and hold mode circuit which comprises the first and second latch means and a flip-flop.

4. The video signal processing apparatus of claim 2, further comprising:

a load and hold mode circuit which comprises the first and second latch means and a flip-flop.

* * * * *